United States Patent [19]
Kuenzel

[11] Patent Number: 6,155,617
[45] Date of Patent: *Dec. 5, 2000

[54] TAMPER RESISTANT CABLE SEAL

[76] Inventor: Rainer Kuenzel, 303B Manor Dr., Kerrville, Tex. 78028

[ * ] Notice: This patent issued on a continued prosecution application filed under 37 CFR 1.53(d), and is subject to the twenty year patent term provisions of 35 U.S.C. 154(a)(2).

[21] Appl. No.: 09/120,223

[22] Filed: Jul. 21, 1998

Related U.S. Application Data

[60] Provisional application No. 60/053,794, Jul. 25, 1997, provisional application No. 60/057,727, Aug. 28, 1997, and provisional application No. 60/067,757, Dec. 10, 1997.

[51] Int. Cl.[7] ................................................ F16G 11/00
[52] U.S. Cl. ................................. 292/318; 292/307 R
[58] Field of Search ..................... 292/307 R, 317–321, 292/323, 325, 328, 329, 252; 24/136 R, 134 L, 132 WL, 136 A, 115 L

[56] References Cited

U.S. PATENT DOCUMENTS

| | | | |
|---|---|---|---|
| 3,994,521 | 11/1976 | Van Gompel | 292/319 |
| 4,141,117 | 2/1979 | Van Gompel | 24/136 |
| 4,681,356 | 7/1987 | Brammell | 292/327 |
| 5,147,145 | 9/1992 | Facey | 403/314 |
| 5,352,003 | 10/1994 | Bystry | 292/323 |
| 5,647,620 | 7/1997 | Kuenzel | 292/317 |
| 5,820,176 | 10/1998 | Leon | 292/323 |

*Primary Examiner*—Gary Estremsky

[57] ABSTRACT

Several embodiments of a wire cable seal are shown. They use a cylindrical body having a passage intersected by two or three slots. Each slot receives a disk rolling in the slot. The slot tapers to pinch the cable in the passage with the disk. Each disk is separately spring loaded to protrude and pinch the cable. The multiple disks are located at different heights and different angles.

35 Claims, 6 Drawing Sheets

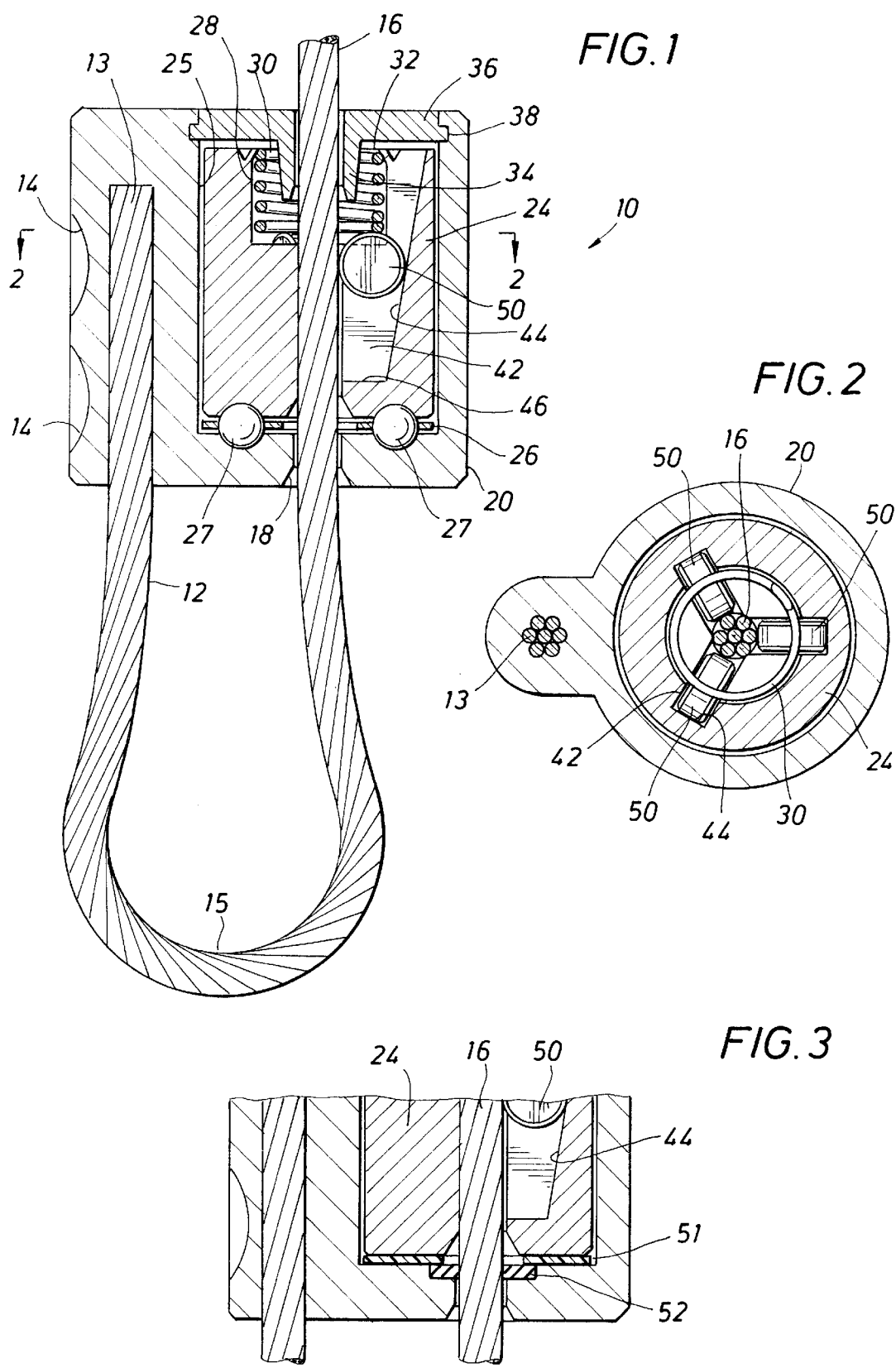

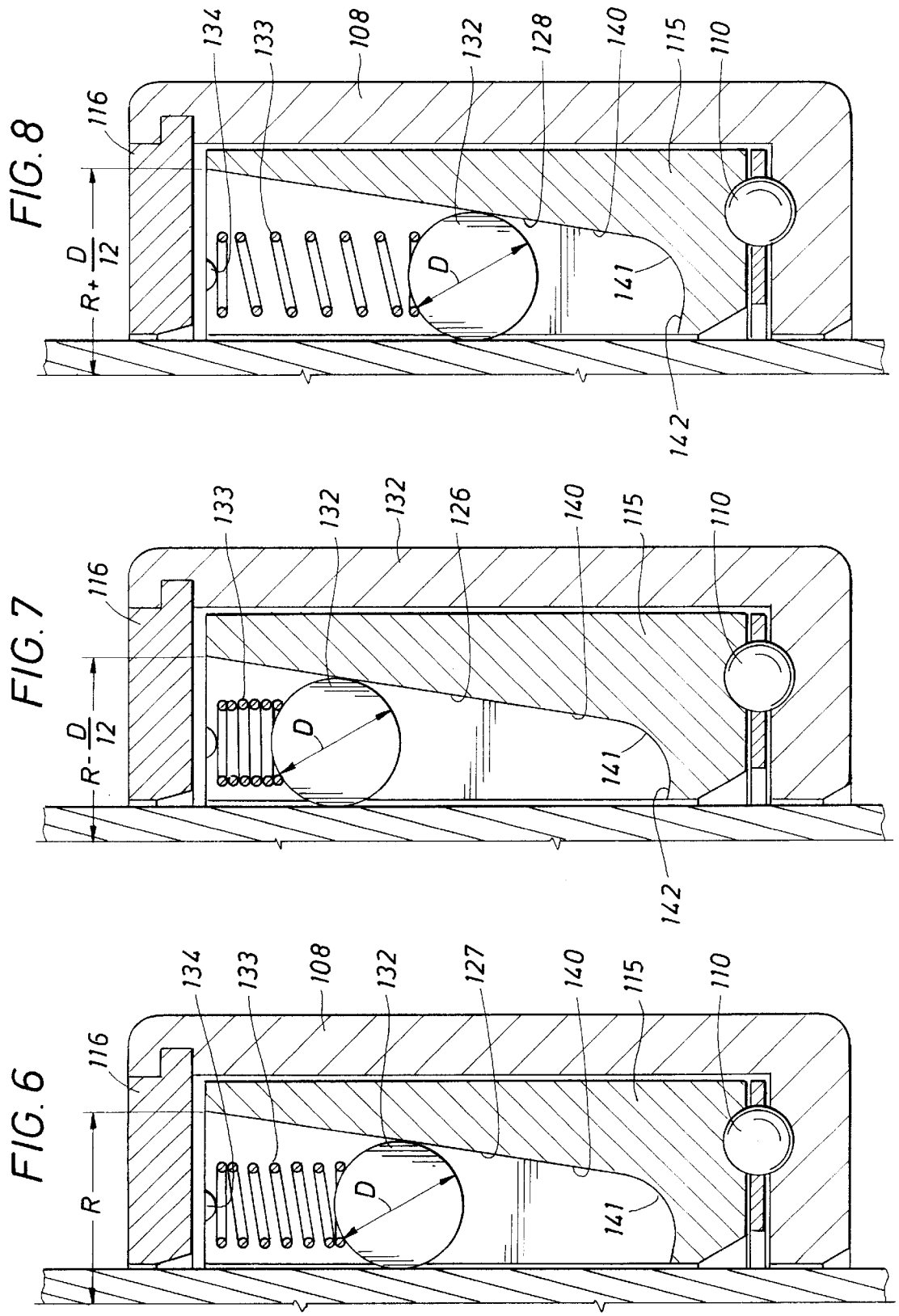

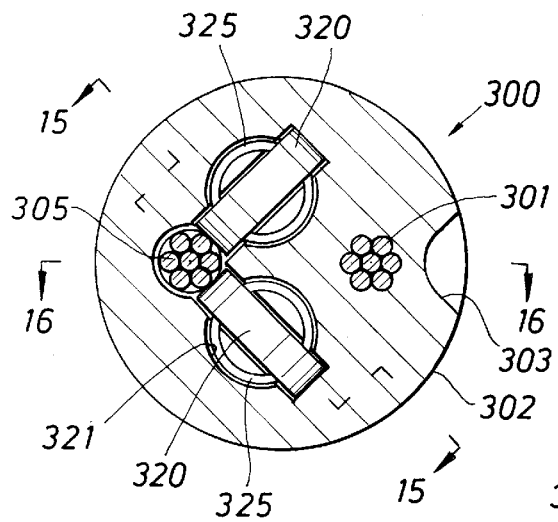
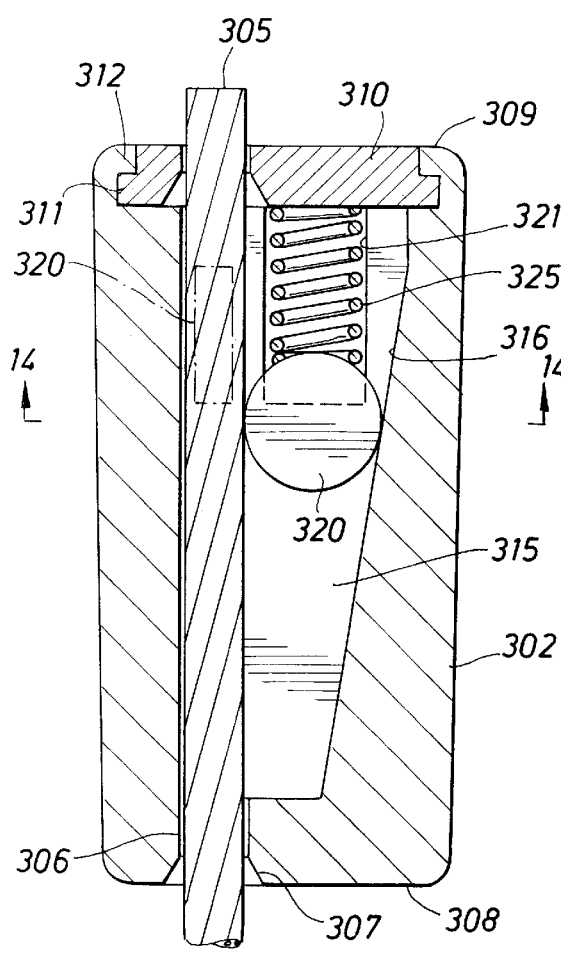
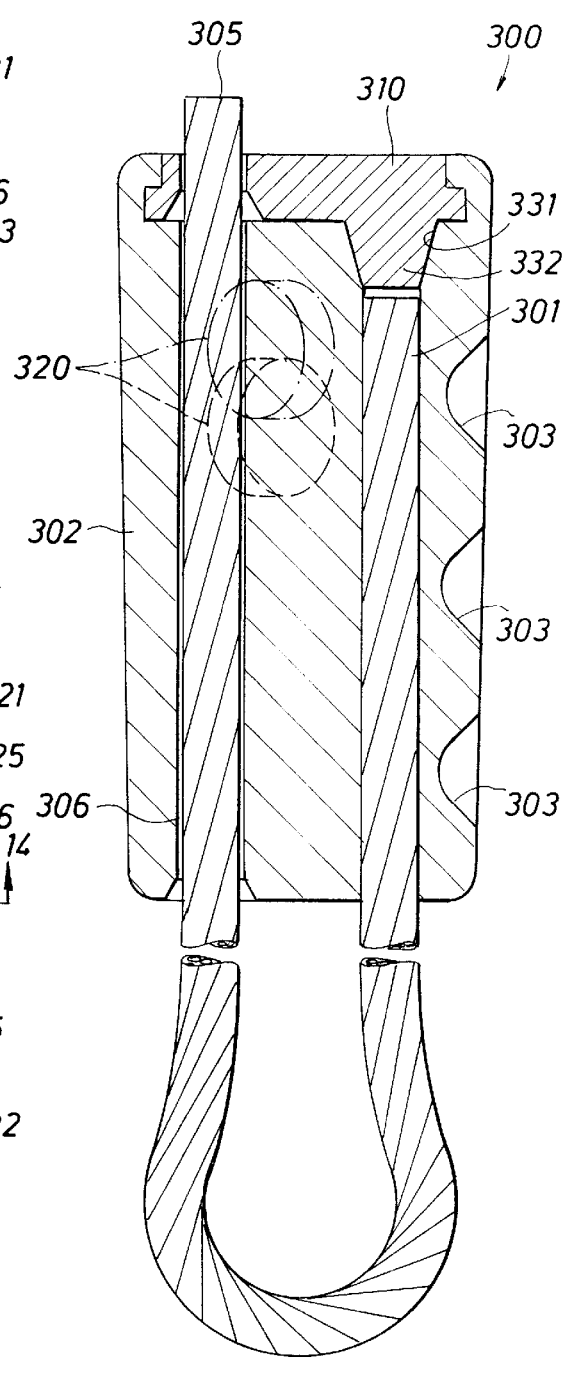

TAMPER RESISTANT CABLE SEAL

This application claims benefit of Provisional Application 60/053,794 filed Jul. 25, 1997 also 60/057,727 filed Aug. 28, 1997, also 60/067,757 filed Dec. 10, 1997.

BACKGROUND OF THE DISCLOSURE

A cable seal is a cable which is looped into a bight and extended through a lock mechanism. They are expendable. Typically, they are installed to close or seal a container and to indicate that the container, once sealed, has not been opened while in shipment. Generally, sealing is done at the time the container is filled. Several types of containers are provided with seals. It is not uncommon to seal a trailer pulled by a truck on the highway. The seal is attached at the back doors and holds the two doors together. To be sure, it is not provided for structural strength but rather for showing, at arrival, that the contents within the trailer have not been tampered with. Another area in which seals find great application is the shipment of various liquids. Expensive lubricants, the essence of perfumes and the like are typically placed in sealed liquid container. Again, they are protected by the seal especially in the sense that it provides an indication that no tampering has occurred. Tampering may involve theft or adulteration. In all instances, the tampering is indicative of problems in the shipping procedure. It is highly desirable that tampering be avoided. Moreover, by avoiding tampering, the cargo behind the seal is deemed to be correctly counted and to have the correct or intended purity. Therefore, the attachment of a seal forms an indication of product security, product purity and great reliance is placed on the seal remaining intact at the destination. If the seal is unbroken, the purchaser typically is willing to pay the full price for the merchandise protected by the seal. If the seal is unbroken, the purchaser is well able to protect and watch over the goods and merchandise protected by the seal.

While seals go back over time, even to the time at which appointed merchants would seal containers using sealing wax with a signet ring, the present day context of the seal of this disclosure particularly deals with theft or adulteration during shipment just as the case 1,000 years ago. Consider a very common example of manufacturing a concentrate which is shipped from a single plant and distributed around the world. This is particularly true with the essence of fragrances or flavors. It is common in the manufacture of food condiments, perfumes, drinks and the like to make and ship a highly concentrated mixture. At the destination, it is diluted with an inexpensive liquid (water, milk, alcohol and so on). At the time of mixing, it is important to know that the product protected by the seal is pure.

Seal tampering is to be distinguished from overt theft. It is easy enough for a thief with the proper hand tools to cut a seal and to throw it away. In that instance, the absence of the seal is indicative of penetration into the closed chamber where the cargo is located. That, however, is not the situation in this instance. In this instance, the protection is important where the seal might have been tampered with. In other words, while the seal is still on the container, the purchaser or recipient may have serious questions based on a quick visual inspection of the seal. The question always comes down simply to one of appearance, namely, does the seal look as though it was tampered with. The present disclosure sets forth a seal which can withstand and indeed resist a tremendous amount of tampering. Assume for purposes of setting forth the problem that a malfeasant with ample time can attack the seal on a concentrated food or drink syrup. In that instance, the goal might well be adulteration or theft of a portion of the cargo. It is important that the seal be constructed so that it resists to the uttermost any attempt to defeat the seal. Most attacks on a seal involve an effort to work the cable, typically by wiggling and jiggling so that the cable feeds back through the seal mechanism. This disclosure sets forth a device which defeats that. Moreover, it is a device which can withstand a tremendous amount of wiggling and jiggling, grasping the bight of the cable and working it back and forth, all to no avail. The seal of the present disclosure, therefore, is resistant to all types of penetration or entry. It is especially resistant to entry by a shaped pointed sleeve. The seal is constructed with a woven cable. The cable, having a nominal diameter, is looped into a bight and the free end is forced through the seal and grasped. A criminal might readily try to work into the seal mechanism to defeat it by forming a tool which is thin wall metal folded as a 180° sleeve or funnel which fits about the cable. The pointed end is stabbed into the locked housing. The goal is to somehow defeat the works on the interior, thereby enabling the cable to be pulled free. That tampering simply is defeated by the apparatus of this disclosure.

This disclosure sets forth a seal with a lock mechanism that is completely resistant to any type of penetration. The penetration brought about by the tool just mentioned will not defeat the equipment. The cable, placed in the housing, is grabbed and held firmly. So to speak, the cable is held from several sides at several locations in the housing. This provides enhanced clamping of the woven wire cable so that no tampering is inflicted through the use of burglar tools of any sort or type.

The apparatus of this disclosure is a lock mechanism equipped with this sort of cable gripping mechanism is not readily or easily defeated. Indeed, the lock mechanism set forth for this cable seal is, for all practical purposes, tamper proof. The present disclosure sets forth a mechanism which threads the free end of the cable through a housing. On the interior, the housing supports a rotatable circular member. It is free to rotate in the housing. It supports a grip mechanism which grabs and holds the free end of the cable. The cable is pinched or clamped. Pulling the cable out of the housing in the wrong direction is therefore prevented because the clamp mechanism gets tighter when the cable is pulled in that direction. It is a one way clamp. The clamp is implemented by positioning a roller in a groove, the roller being caught or pinched in the groove with a tapered face. The tapered face changes the gap or span in which the rolling disk is captured, thereby positioning the tapered face so that the disk pinches against the cable. An improved enhancement contemplates the installation of three such grooves with three such disks in them. In one embodiment they can all clamp the cable at the same relative height; in another embodiment, different size diameter rollers are installed to achieve the clamping action. In another aspect, identical disks can be used but the grooves are cut at different radial locations. In the latter, the grooves are provided with different relative positions so that the cable is gripped at spaced locations along the cable. This helps hold in a different way. It forces the cable, contacted at different locations, to distort and bend in such a way that the cable is pinched indefinitely against release.

In another aspect, the disks are forced against the tapered face by a resilient spring. One spring is installed coaxially about the cable so that the bottom loop of the spring bears against multiple disks and forces them inwardly against the cable thereby increasing the bight each disk takes when jammed against the cable. The cable is therefore gripped in a better fashion. Once the free end of the cable is looped into a bight and threaded through the housing, release, using this mechanism, is impossible, and defeat by burglar tools and the like is not possible. Therefore, this construction helps overcome entry by burglars, thieves or other malfeasants.

The present device is summarized as a tamper resistance cable seal having a housing which attaches to the dead end of the cable and an opening for receiving the free end. Once the free end is threaded through the device, it locks and that prevents further retrieval. The present housing encloses a circular insert which is free to rotate. No matter how many turns are imparted in either direction, the cable is held constantly without rotational slippage. The insert within is mounted on individual balls which define a bearing raceway. A coil spring forces the insert against the bearings. In addition, the cylindrical insert is formed with a radial slot having a tapered face. The taper on the face guides a spring forced disk to a specified depth in the tapered groove. This initiates clamping of the cable by the disk extending from the tapered groove. Different embodiments use different points of contact achieved by a disk in each of multiple grooves, the optimum being three grooves and three disks located at 120° spacing so that the cable is gripped on three sides.

It has been discovered that one improvement which enables even greater resistance against working the cable free can be obtained in the following fashion. It is desirable to avoid this wiggling release problem attempted by a thief by increasing the strength of the spring in the cable lock housing, the spring bearing against the roller or disk which bears against the cable. If the spring is made unduly weak, defeat is obtained by patient working of the cable. If the spring is made stronger, that will not happen. By making the spring much stronger than that threshold requirement, the spring jams the disk without doubt or uncertainty in the tapered groove for the disk. That assures that the cable is locked, but it is accomplished at a difficult price. One difficulty arising from that is the difficulty of initially threading the cable. As will be discussed, it is somewhat difficult to dislodge the disk when striking at the tangential edge where the cable is guided into the housing by the tapered faces defining the chamber which holds the disk or roller. The present disclosure overcomes this and enables a very strong spring to be used.

Another embodiment of the present disclosure uses a pair of the rollers or disks mentioned above. They are installed at right angles to each other with respect to the movable insert within the housing. The insert is a cylindrical body with a central or axial passage through the cable. It is positioned immediately adjacent to a pair of the flat disks which are captured in tapered grooves. The two grooves, in cross section, are positioned at right angles. The two disks jam the cable against the opposite side of the central passage for the cable. The two disks are preferably located at different heights with different tapered slots so that they pinch at different locations along the length of the cable. In effect, this defines (in cross section) a V-shaped profile having the point of the V centered at the center line of the insert body.

In an embodiment worth noting, that V-shaped cut on the interior of the insert is readily moved over to the side of the insert. In that instance, the insert is built substantially without the cylindrical housing. In the first embodiment, the insert is a round cylindrical body which fits within a housing, and the center line axis of the housing and insert defines the point of insertion of the free end of the woven cable. Using the insert only, the hole is offset from the center and the V-shaped internal cut defined by the intersecting right angle slots is located so that the same size cable and the same size rollers are cooperatively offset in an insert body of decreased diameter. By this approach, both cable ends can be terminated in the insert body (meaning the two cable ends engage the insert without a rotative movable housing).

IN THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may add to other equally effective embodiments.

FIG. 1 of the drawings is a sectional view through a cable seal showing a cable looped through it wherein the movable end of the cable is locked in such a fashion that the internal component is rotatable with tampering, and FIG. 1 further shows a set of spring loaded guide disks which assist in locking;

FIG. 2 is a sectional view along the line 2—2 of FIG. 1 showing the alignment of the locking disks which engage the cable extending through the cable seal;

FIG. 3 shows an alternate embodiment of the lower end of the central components utilizing a Teflon disk for a bearing surface;

FIGS. 6, 7 and 8 are sectional views taken through the three locking disks shown in FIG. 5 and showing differences in the groove where the disks are mounted which modifies the grip applied to the cable;

FIG. 14 is an alternate view which differs from the embodiment shown in FIGS. 9 and 10 wherein the apparatus positions the cable passage in an offset location so that the diameter of the insert body is smaller, and further omits a surrounding housing;

FIG. 15 is a view taking along the line 15—15 at FIG. 14 and shows in sectional view the construction of the offset cable passage, the slots and roller disks which contact against the cable; and FIG. 16 is a sectional view taking along the line 16—16 at FIG. 14 and further illustrating how both ends of the woven cable are anchored within the insert body of FIG. 14.

DETAILED DESCRIPTION OF THE PREFERRED EMBODIMENTS

Figure 4:
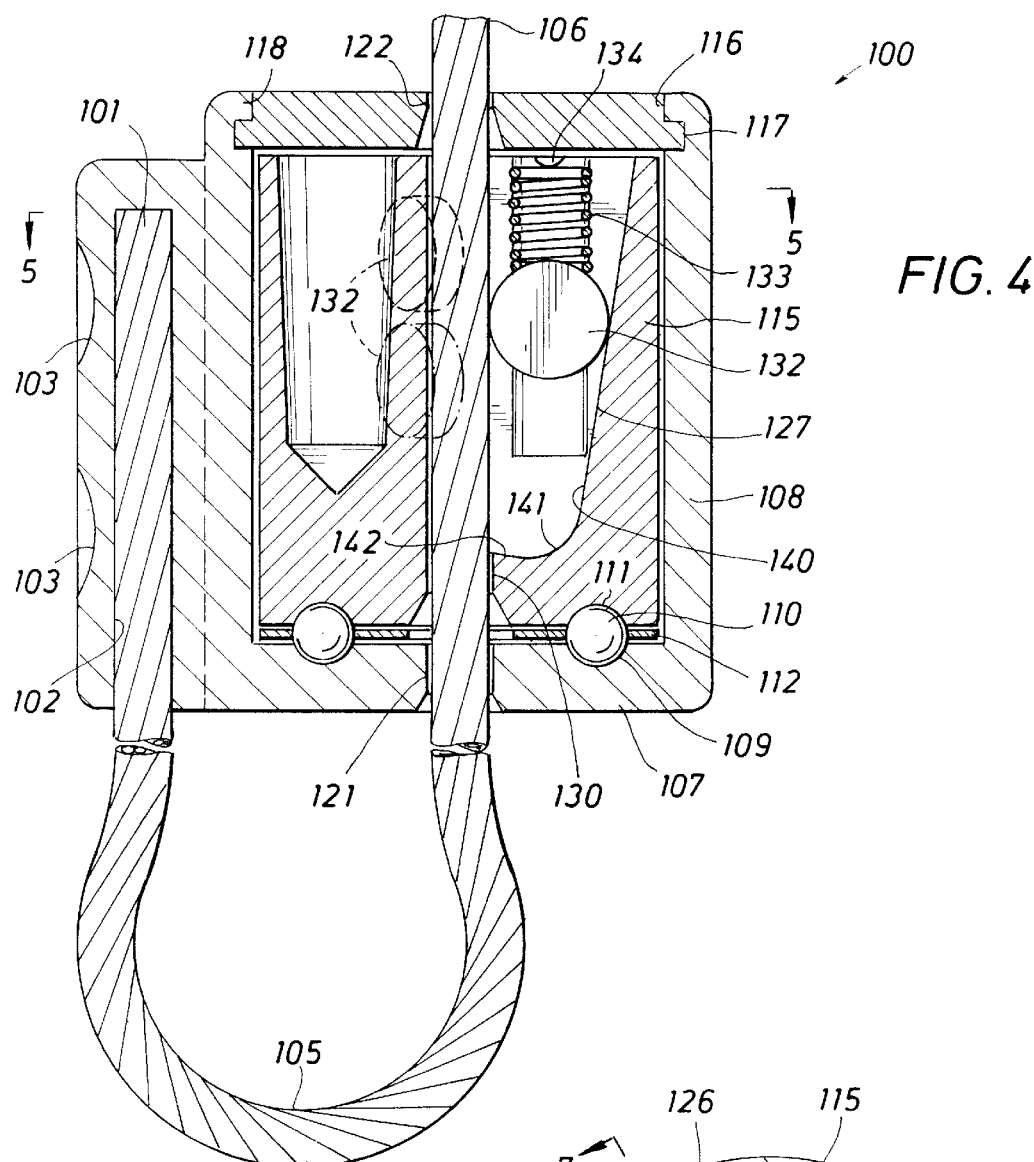
FIG. 4 is a sectional view through a second embodiment of the present disclosure particularly illustrating three separate disks which grasp the free end of the cable to lock it in position and further illustrating that the disks make contact with the cable at spaced elevations along the cable in the housing.

Attention is directed to FIG. 1 of the drawings where the cable seal of the present apparatus is identified by the numeral 10. A cable 12 has a dead end 13 which is gripped in a hollow tubular sleeve and is gripped by dimpling the sleeve at 14. The dimples force the sleeve to grip the dead end 13 in a better fashion. The cable extends into a bight 15 and a free end 16 is extended through the hollow cylindrical housing 20 by entry at a small opening 18 sized for the free end of the cable 16. The cable extends fully through and is locked as will be explained.

A cylindrical spool 24 is rotatable on the interior. It fits snugly but freely within a sized opening 25 which has the diameter and depth to receive the spool 24. The outer surface of the spool is cylindrical, and the end faces are both planar and parallel. The spool 24 is separate but captured. It is axially hollow on the interior and is above an alignment disk 26. The disk has a set of holes in it to capture and guide ball bearings 27. The spool bears against the bearings 27 which reduce friction with rotation. Rotation in either direction is accommodated.

The spool is drilled at the upper end to define a cylindrical chamber 28 for receiving a compressed coil spring 30. The coil spring is locked in place by the dimples 32. Moreover, the spring is centered around a protruding skirt 34 extending to the interior of the spool 24. The skirt fits snugly around the cable 16. It does not need to contact it, but clearance is maintained at a minimum. The skirt 34 is integral with a circular disk 36 which closes the open upper end of the housing 20. It is positioned by insertion into the appropriate cavity and can be locked for instance by an overhanging lip to lock a protruding lock ear 38 which aligns with an appropriate undercut slot.

On the interior, the spool 24 is formed with an axial groove 42 which is cut to the sloping shoulder 44 at the outer edge and which has a maximum depth to the face 46. The face 46 defines the maximum penetration of the groove 44. Going momentarily to FIG. 2 of the drawings, the groove has a width to enable it to receive a roller disk 50. The disk 50 has a cylindrical outer face and locks against the free end of the cable. The disk grips the cable, wedging on the tapered face 44 of the narrow groove. The groove is sized slightly wider than the thickness of the disk 50. This avoids binding of the disk so that it is free to rotate. The disk falls toward the bottom face 46 before the cable 16 is inserted. When the cable is inserted, the disk 50 is pushed upwardly. When the disk moves upwardly, it bears against the bottom of the coil spring 30. The spring forces the disk 50 downwardly to a locking position.

FIG. 2 of the drawings show three of the disks 50. Collectively, they grip and lock against the free end 16 of the cable. The cable is forced upwardly in FIG. 1 of the drawings, dislodging all three of the disks 50 from the bottom most position where they move upwardly on the tapered outer face 44. They are forced upwardly until they spread apart sufficiently that the cable can be inserted and dislodge them and ultimately move past the three disks. As shown in FIG. 2, the three disks lock in the fashion of movable jaws around the cable. The cable can be forced upwardly and the disks will roll away from the cable. When the cable is pulled downwardly, the three disks are forced by the spring 30 against the cable and lock on the narrowing groove face 44.

In FIG. 3 of the drawings, the cable 16 is shown locked in the spool 24 where it is held in position by the disk 50 which bears against the groove face 44. As before, the spool is held in the housing 20. The embodiment 10 shown in FIG. 1 accomplishes rolling movement of the insert which is carried on the ball bearings 27. They are held in alignment with the disk 26 noted in FIG. 1 of the drawings. In the embodiment of FIG. 3, the ball bearings can be omitted. Smooth motion is provided by a pair of smooth surfaces. There is a circular sheet of slick plastic material 51, and it bears against a confronting disk 52. The disk provides face to face contact. In the typical installation, the disk 51 is preferably formed of a slick plastic material such as nylon, Teflon (a trademark of Dupont Company) or other slick materials. It works against a facing disk which is typically smaller and has a narrow opening therethrough. This disk is conforming material to enable easy rotation. It provides a sliding facial seal.

One Alternate Embodiment

Figure 5:
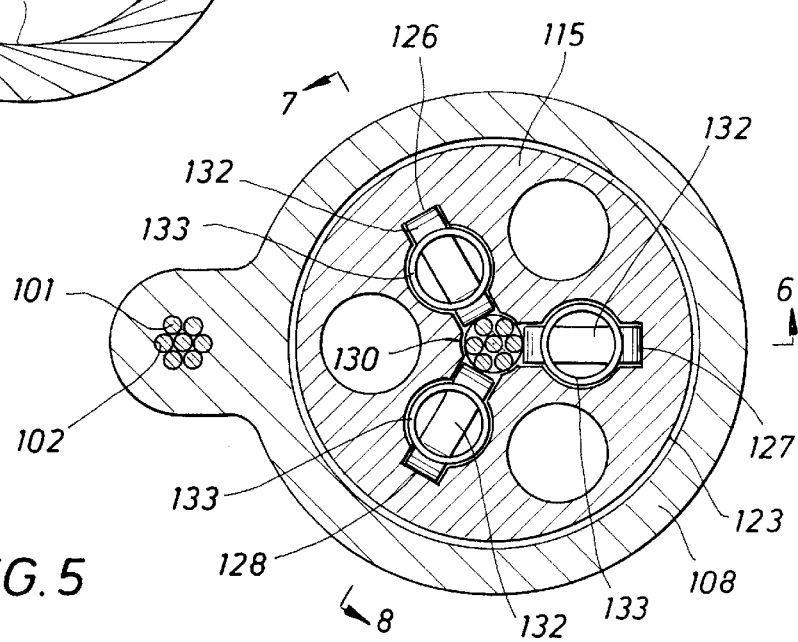
FIG. 5 is a sectional view taken along the line 5—5 in FIG. 4 illustrating a cross sectional profile of the housing of the lock.

Attention is now directed to FIG. 4 of the drawings where the reference numeral 100 identifies an alternate embodiment. The embodiment 100 cooperates with a similar cable having a dead end 101 which is locked in a cylindrical cavity 102 and which is held in place by deforming the cavity. Deformation of the cavity is obtained at the dimple 103, there being two in the preferred form, thereby crimping the housing so that the cable is grasped. The cable has a bight 105 which is sized dependent on the amount of the cable pulled through the housing. The cable has a free end 106 which is readily able to pass through the housing as will be described. Diverting only for the moment to FIG. 5, it shows the cylindrical housing 102 which surrounds the cable dead end 101 and locks it in position. The profile of the structure is best shown in FIG. 5 where it is described primarily as a cylindrical housing formed by a relatively thick outer wall which encloses a rotatable or movable part as will be detailed. As better shown in FIG. 5, this construction enables the equipment to support three different cable lock mechanisms which are deployed at 120° spacing around the centerline axis with respect to the cable. Gripping is accomplished as a result of that operation.

Returning to FIG. 4 of the drawings, this shows the housing to have an end plate 107 which is joined to and integrally constructed with a cylindrical side wall 108. The end 107 is formed with a circular raceway 109 which receives the ball bearings 110. As shown in FIG. 4, the balls are spaced by the disk 112 so that they are approximately evenly spaced in the bottom raceway 109 and the top raceway 111. This circular disk 112 is provided with a thickness sufficient to separate the two components.

The circular bottom 107 with the cylindrical sidewall 108 defines a central cavity of cylindrical cross sectional shape (as shown in FIG. 5) which supports, encloses and aligns a cylindrical rotatable insert 115. The insert 115 is constructed with planar top and bottom faces. It is sized so that it just fits snugly inside the cylindrical shell 108. It is received below a circular cap 116 which is inserted and locked into position with a lip 117 securing it in place. The top edge is folded over at 118 to define an interlocking lip for securing the cover 116 in place. It is formed of a circular disk having the protruding lower lip on it which enables locking. When locked, the overlapping lip 118 above the lower lip 117 secures the cap or top in place. The free end 106 is inserted first through the centerline opening 121 and emerges from the opening 122 which lines up with that opening. The alignment of the two openings is along the centerline so that there is no need for the cable to bend or flex when inserted. When inserted, the cable 106 is then positioned along a passageway which includes the entry points 121 and 122. Typically, they are dimensioned so that the two entry points are properly lined up with the cable so that the full diameter of the cable substantially fills the two openings. That is, there is very little gap around the cable at the openings 121 and 122.

The rotatable insert 115 is also shown in FIG. 5 of the drawings to incorporate an outer face 123. The outer face 123 is sized to fit snugly adjacent to the inside wall without frictional dragging when rotation occurs. The cylindrical body on the interior is provided with transverse end faces and the cylindrical outer wall. The two ends which cap the cylindrical housing thus confine the insert 115 as a rotatable member on the interior. Going now to FIG. 5, the view shows a machined radial slot 126 deployed at 120° from a similar slot 127 and another slot 128. The three slots terminate at the central passage 130. The central passage 130 is constructed along the centerline axis of the insert. The three slots extending radially outwardly define a guide path for each of three rotatable disks 132, better shown in FIG. 4. Each slot receives its own disk. In turn, each disk is forced downwardly by a coil spring 133, see FIG. 4. The coil spring has a diameter which is wider than the slots 126, 127 and 128. It is shown positioned in a modified slot. The slot is enlarged to accommodate the coil spring by a round hole drilled coincident with the slot so that it forms arcuate sides to the slots as indicated by the circular segments 133 shown in FIG. 5. This is done for all three slots. Each disk 132 is forced downwardly by an assigned spring 133. The springs are incorporated so that the disks are forced downwardly. Each spring is fastened in place by a dimple 134 which contacts the closed end of the spring. Furthermore, each coil spring cannot escape once positioned in the round hole 133 (see FIG. 5).

Consider the construction of an individual slot. Going to the slot shown in FIG. 4, the slot extends downwardly with a tapered construction; the width narrows toward the bottom. The disk rolls against the face 140 which is inclined so that the disk extends into the pathway where the cable is located in an ordinary installation. As the disk moves lower, it extends further to the left into the pathway. At the bottom, the tapered and sloping wall 140 extends significantly closer to the desired position for the installed cable end. The sloping wall 140 curves at 141 and becomes slightly inclined upwardly at 142. The incline upwardly at the very bottom biases the disk to roll (in the absence of a cable) into the curvature 141. This leaves only a portion protruding into the pathway of the inserted woven cable.

Attention is now directed to FIGS. 6, 7 and 8 jointly. In every instance, they are equipped with a disk 132, and the disk is forced downwardly by the coil spring 133. In all three instances, the coil spring is held in position by the same closed end spring construction. There is, however, a difference in each of the three views. They show a common profile in the cut made defining the slots. The respective slots are, in that sense, all identical in profile, but they are offset in location. This offset in location is given by the distance R which is the radial offset of the three respective slots. As shown in FIG. 6, the distance R has been illustrated. That distance has been increased and decreased by D/12 where D is the diameter of the disk 132. In every instance, the sloping shoulder 140 has a common slope, approximately 9° in this version. The 9° departure from the vertical is also found in the form of a 9° slope on the bottom surface 142 which defines a corner where the disk rests in a somewhat retracted position absent the cable. When freshly manufactured, the disk can travel no further than the corner 141 which is cut to a curvature which approximates that of the disk 132.

The three disks shown in FIGS. 6, 7 and 8 have positions at different heights with respect to the cable once it is inserted. FIG. 7 shows the disk at the highest location in view of the fact that the radial slot is slightly more narrow, while the disk in FIG. 8 is at the lowest position in view of the larger radial distance marked on the view. It will be observed that the small increment in radial offset results in positioning the three respective disks at vertical spacing which is about D/2. Accordingly, the disk in FIG. 7 is about one full diameter above the disk in FIG. 8.

The three disks bear against the cable at different elevations as illustrated in phantom line in FIG. 4. So to speak, this creates an enhanced pinching movement on the cable which holds it in a better fashion. When the bight is pulled to defeat the seal, the three disks all hold, tending to bend the cable somewhat at the point of impact. The disks are wedged downwardly on the inclined surface holding the disks in position thereby prompting a wedging action which prevents defeat of the device. Twisting and untwisting the bight will have no effect because the insert on the interior of the housing is free to rotate while maintaining the strong grip achieved by the wedged disks. The seal is significantly protected against tampering by this arrangement.

Another Alternative Embodiment

Figure 9:
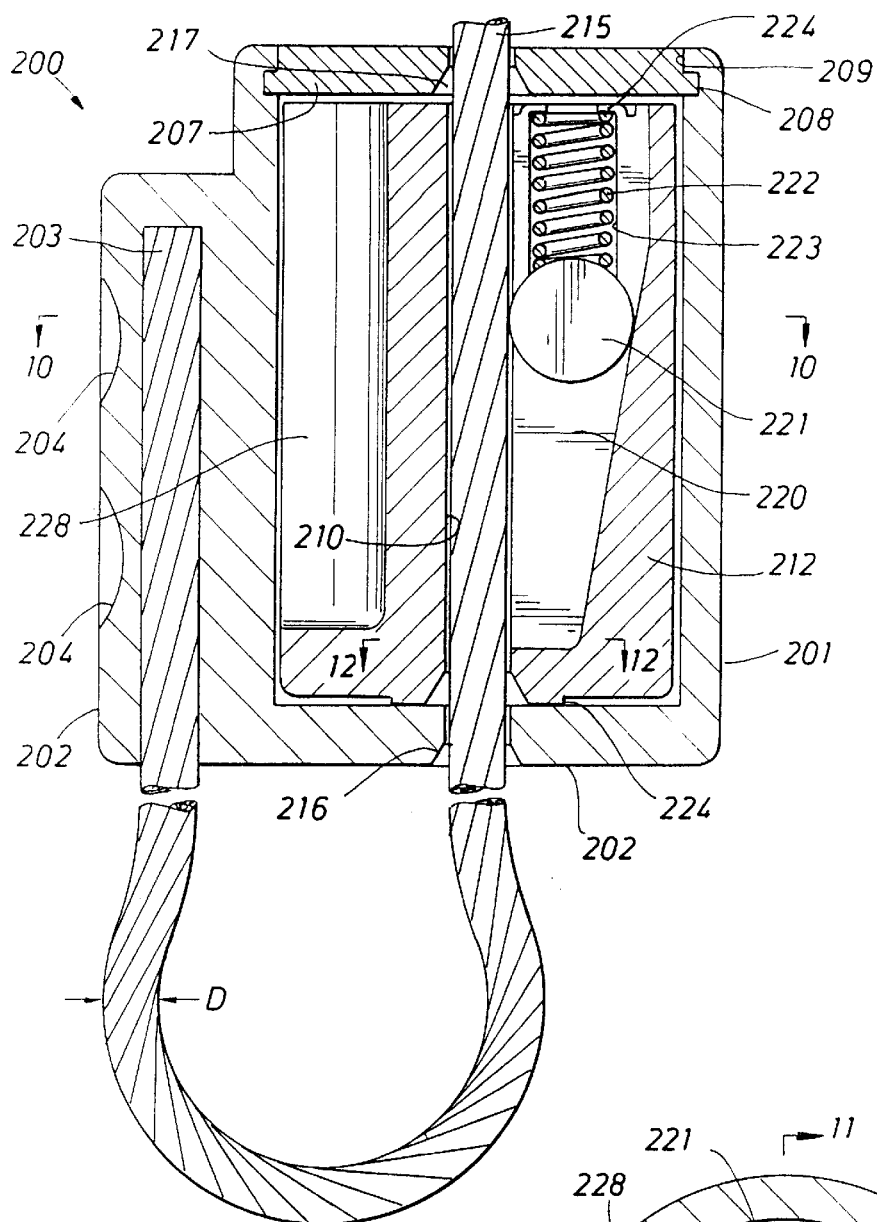
FIG. 9 is a sectional view through an alternate embodiment showing details of construction.

Attention is directed now to FIG. 9 of the drawings where the numeral 200 identifies another embodiment. Viewing FIGS. 9 and 10 jointly, this embodiment has an elongate cylindrical housing 201 which terminates at a circular end face 205 which is formed of integral construction. Along one side, there is a cylindrical bulge 202 and it provides an axial passage along the bulge 202 to receive the dead end 203. The cable is locked in position by the dimples 204 which grip the dead end of the cable.

Figure 10:
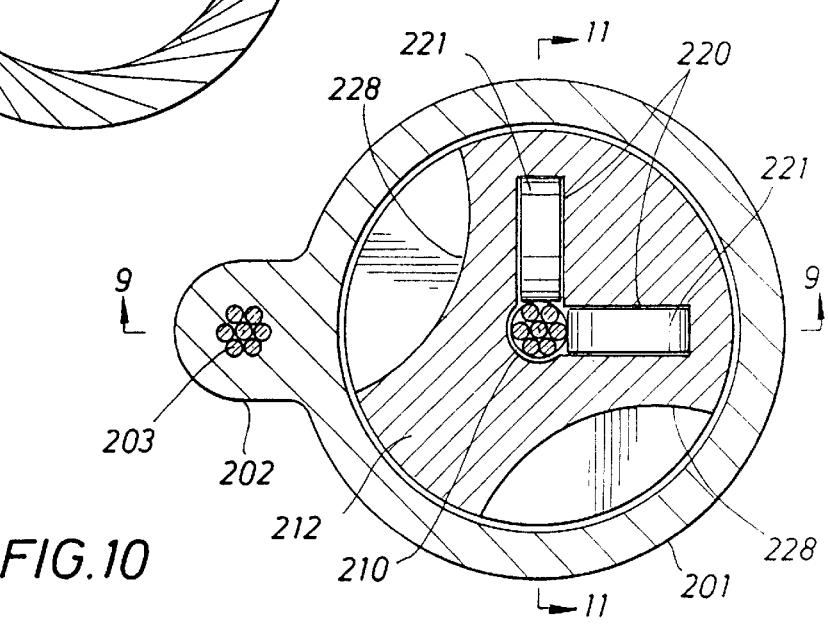
FIG. 10 is a sectional view through the embodiment shown in FIG. 9 along the line 10—10 and further illustrates an insert having locking disks located in grooves which are at right angles.
Figure 11:
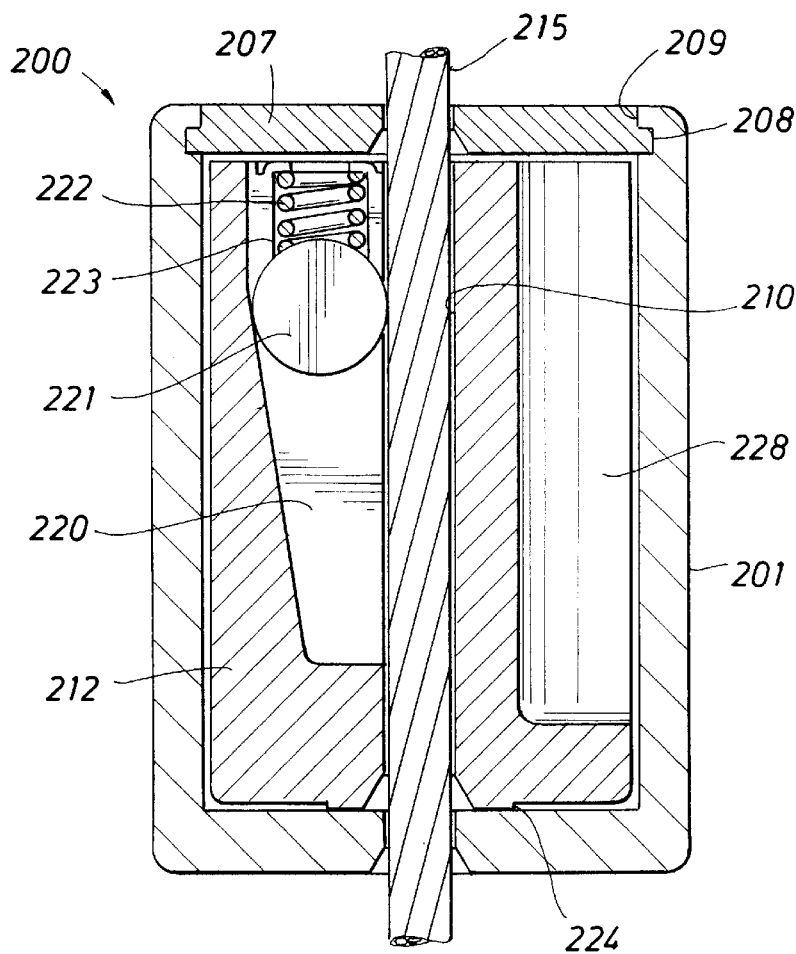
FIG. 11 is a sectional view through the embodiment shown in FIGS. 9 and 10 where the sectional view of FIG. 11 is at right angles with the sectional view of FIG. 9.

As noted, the housing 201 is provided with a cylindrical cavity. This cavity is elongate and circular in cross section as illustrated in FIG. 10. The top end of the cavity is closed by a cover 207, and the cover 207 supports a lip 208 which locks with the over reaching lip 209. The lips are locked quarter turn or alternatively, the lip 209 can be crimped over so that a smooth connection is formed and the circular disk 207 can not be defeated.

There is an elongate cylindrical passage 210 through the insert 212. The insert 212 is centered around the passage 210. The passage 210 is constructed with a diameter to solidly anchor the free end 215 of the cable. The cable has a diameter D which is marked in FIG. 9 and which will be discussed in some detail below. At the contact area where the cable free end 215 is inserted, there is a conic opening 216 to guide the cable into the passage 210. Another is also shown at 217 at the upper end.

When the cable is threaded fully through to the upper end, the cable is then locked by the operation of the embodiment 200. Explaining, this embodiment includes the slot 220 which extends from the center line axial bore 210. The slot 220 is shown also in FIG. 10 and is duplicated so that there are two slots 220, with slots at right angles. The two slots define right angle positioned receptacles for the locking disks 221 which are confined in the two slots. As in the earlier embodiments, each disk is forced downwardly by the coil spring 222 thereabove. The coil spring again is received in an enlarged opening 223 which is formed with a circular passage so that the circular bore intercepts the slot 220 in the fashion illustrated in the embodiment shown in FIGS. 4–8. The coil spring 222 is positioned above the responsive disk 221; this is done for each of the two disks so that there are two coils springs. The springs are held in the insert 212. Conveniently, a lip 224 is crimped over to lock the springs in position. The net result of this is the resilient and movable disk 221 which clamps against the free end 215 of the cable.

The cable has a diameter D sized to fit just within the passage 210. The insert 212 is supported on a raised central protrusion 226 which is relatively shallow, having a height of only about 0.002 inches or slightly greater than that. It defines a planar end face. The planar end face contacts against the opposing face next to it to hold the insert in a slightly elevated position. It is a thrust bearing surface. Typically, the components 202 and 212 are made of metal which is relatively smooth when cast or otherwise machined and which provides a bearing surface. Improvement over this is not essential.

Figure 12:
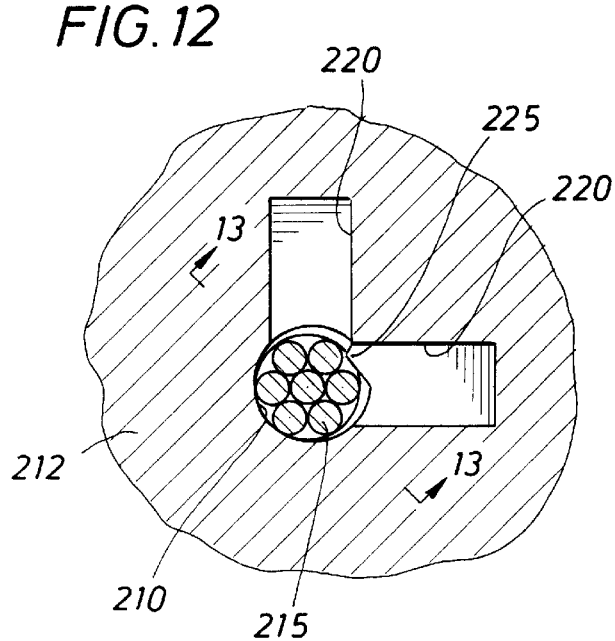
FIG. 12 is a sectional view of the intersection between the slots arranged at right angles with respect to the center line axis of the insert.
Figure 13:
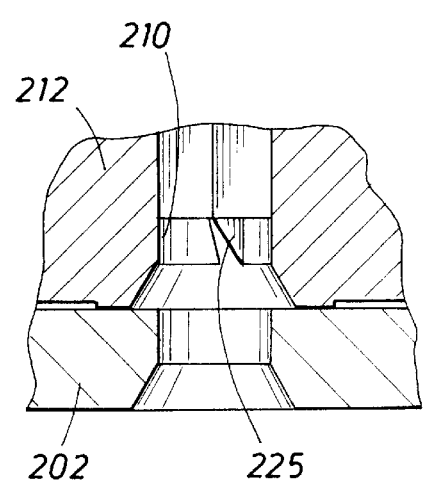
FIG. 13 is an enlarged view along the line 13—13 of FIG. 12 showing a tapered surface which effectively defeats inserted tampering devices.

Reverting to FIG. 10 of the drawings, the insert 212 is cylindrical having the V-shaped construction positioned in the center of FIG. 10. That clamping action assures that the cable 215 is held. The intersection between the two slots is best understood on viewing FIG. 12, a sectional view taken at the bottom of the two slots. It shows the solid planar end portion of the integral insert. At the apex of the corner, the sectional cut line in FIG. 13 illustrates the bottom plate 205 and the bottom portion of the insert body 212. Here, the two slots 220 intercept at a straight line so that one side is shaped into a protruding nose 225 which thereby deflects the point of tampering tools to the side. Typically, a tampering tool will have the shape of a point of the end of a metal instrument which is curled or rolled to a diameter to fit snugly around the particular gauge cable involved. Protruding nose 225 will defeat a tool pushing up both disks 221 simultaneously. Tampering is forbidden.

As illustrated in FIG. 13, the nosee 225 prevents or deflects tampering devices. Such devices will typically be inserted and rotated trying to line them up to create an override kind of mechanism thereby preventing proper operation. This surface will stop that.

Going now back to FIG. 10, the cylindrical insert is reduced in size and weight by two large arcuate notches 228. This simply reduces the total amount of metal. It still leaves adequate wall thickness adjacent to the two slots to assure a strong structure.

Simplified Embodiment Incorporating Locking Slots with an Eccentered Cable Passage Attention is directed to the embodiment 300 which is shown jointly in FIGS. 14, 15 and 16. This particular version of equipment is a simplified structure in that it has fewer moving parts and is less costly to manufacture. Primarily, the parts are reduced in quantity by omitting the hollow cylindrical housing. Rather, the rotational function which is accomplished in the embodiment 100 to take an example is deleted. This simplification provides the embodiment 300 with fewer parts and reduced size. Moreover, the embodiment 300 compares favorably with the embodiment 200 in the mass of metal involved in the insert itself. The embodiment 200 features an insert of a specified diameter. The cross sectional view in FIG. 10 shows a certain size for the two slots 220 and the cable passage 210 through the center of the insert. A comparable size cable is utilized in the embodiment 300, and the two slots arranged at right angles are also incorporated in the embodiment 300. In that sense the structure is the same, speaking primarily of the interaction between the cable and the locking disks that cooperate with the cable.

The cross sectional area of the embodiment shown in FIG. 14 accommodates the same size structure as just noted yet within a reduced cross sectional area. A representative change in scale is obtained by reducing the diameter of the insert shown in FIG. 10 from 0.470" to 0.375", a significant reduction. This is possible because passage 306 is now eccentered. Even with that reduction the operative components remain built to the same size. The embodiment 300 thus includes the dead end 301 of the cable which is placed in a passage in the insert body 302. A dimple 303 is formed to lock the dead end cable. This enables the bight to be defined as before. The free end of the cable 305 is inserted into a passage 306 which is sized for the cable. Little clearance is provided. The cable passage is formed with a chamfered opening 307 as shown in FIG. 15 to align the cable. The insert body is elongate and cylindrical. It has no housing surrounding it. It terminates at a lower transverse face 308. The face in conjunction with the upper end face 309 defines the right cylindrical construction. The top end of the cylinder is closed by positioning a circular disk 310 at the upper end. The disk 310 has a surrounding lip 311 with locks under a peripheral lip 312. The lip 312 is integral with the insert body 302. This enables the disk 310 to be inserted and locked in position. In the preferred form, the disk is locked in place by crimping the two lips or alternately by installing a quarter turn global search twist lock.

The elongate cylindrical body forming the insert is a solid, right cylinder body which is formed with the passage 306 extending fully through the body. Again, it is adjacent to first and second slots 315. The slots are equal in width and have a tapered wall 316 which is canted at an angle with respect to the center line axis of the cable. The two slots differ only in that the tapered wall 316 starts higher for one than the other. The slot shown in FIG. 15 receives a circular disk 320. The disk is included to lock against the cable to secure the cable. The disk presses against the cable and deforms it slightly. The second slot is closer to or more remote from the cable. By setting the tapered faces of the two slots at a common angle but beginning at different elevations in the structure, one disk is higher than the other. This is shown in FIG. 15 where the second disk at right angles shown in phantom line is higher in the structure. This changes the dynamics of tampering significantly as noted before.

The slot 315 is drilled with a circular passage, the passage 321 being illustrated in both FIGS. 14 and 15. The circular passage functions as a confining housing for the coil spring 325 which is placed in it. The coil spring bears against the disk 320 and forces it downwardly. The coil spring urges the disk into a locking reaction with the cable to assure locking. The coil spring bears against the closure disk 310 at the top end of the structure. The compression spring provides a force downwardly to accomplish locking.

The two springs both provide a force against the respective disk under each spring to accomplish locking of the cable. Since they are at right angles, they cooperate. They are slightly offset vertically as shown in FIG. 15 so that the forces applied grip the cable significantly and hold the cable to prevent retrieval of the free end 305. Tampering will not successfully pull the cable out.

FIG. 16 illustrates in significant detail how the cable is looped into a bight outside the embodiment 300 and secures both ends of the cable. The added elaboration in FIG. 16 shows the dead end of the cable 301 located at or below a simple funnel shaped receptacle 331 just below the closure disk 310. In this instance, the closure disk is constructed with an appendage 332 which extends downwardly into the receptacle 331 for alignment of the circular closure disk 310.

For ease of manufacture, the cover disk 310 is added after the dead end of the cable is positioned in the illustrated location. FIG. 16 also exemplifies the spacing of the two locking disks which are at different elevations in the structure. The phantom line representation shows how the cable is gripped and clamped. By appropriate choice of spring constants for the two springs, selection of the cable diameter, and clamping of the structure when actuated, significant locking forces can be applied. In the embodiment mentioned earlier having a diameter of 0.375 inches and using a typical woven cable, it is easy to support seven hundred to one thousand pounds in the bight without destruction of the device. Moreover this kind of operation enables defeat of tampering tools. Insertion of a tampering tool is substantially defeated, and working the cable back and forth will not readily dislodge the cable from the grip of the V-shaped clamping mechanism illustrated in the embodiment 300.

In one other aspect, this embodiment has an advantage. By omission of the external housing and by reduction of the diameter of the insert body, the amount of metal required to manufacture this device is reduced. It becomes smaller in an overall sense and less costly as a bonus. It therefore assures appropriate construction to enable clamping and significant security.

The embodiment 300 probably is about ten to twenty percent less costly to manufacture compared with a comparable size version of the embodiments identified earlier. The embodiment 300 finds acceptance in situations where a less expensive device is desirable.

While the foregoing is directed to different alternate embodiments, the scope of the present disclosure is determined by the claims which follow.

I claim:

1. A cable lock device for closing a cargo container comprising:
    (a) an axially oriented, closed housing comprising a surrounding body for said lock device;
    (b) an elongate cable having a free end and a dead end wherein the dead end of the cable is connected to said housing;
    (c) an internal passage through said housing to receive said cable free end and having a surface for cable contact wherein the passage receives the cable free end at an inlet; and
    (d) a plurality of movable jamming members, each of said jamming members movably mounted within a dedicated sloping slot within said housing, the slots radially offset from each other with respect to said cable said jamming members adapted to move toward and away from said cable so that said jamming members jam against said cable and thereby lock said cable against said surface, and the slots are configured so that (1) with the jamming members positioned to lock the cable, (2) the jamming members are axially offset from each other with respect to said cable.

2. The apparatus of claim 1 wherein said housing includes a sized opening for receiving said cable dead end therethrough and incorporates an internal surface locking said dead end so that the dead end of said cable is enclosed within said housing.

3. The apparatus of claim 1 wherein said closed housing incorporates said surface extending along at least a portion of said internal passage to define said passage.

4. The apparatus of claim 1, further comprising a resilient biasing member, and wherein each of said jamming members comprises a rotatable disk having a circular periphery bearing against said cable biased by the biasing member.

5. The apparatus of claim 1, further comprising a resilient biasing member associated with each of the jamming members, and wherein each of said biasing members bears against its associated jamming member to urge said jamming member toward said cable, and wherein each of said jamming members is moved aside when said cable is inserted through said passage.

6. The apparatus of claim 5 wherein each said jamming member is a disk and said disk is confined between a pair of associated slot faces to move therebetween, and each said sloping slot tapers to guide said disk against said cable.

7. The apparatus of claim 6 wherein each said disk is captured between said associated slot faces to wedge against said cable, and when installed in said housing, is positioned for locking.

8. The apparatus of claim 6 wherein said slot faces define, in cross section, a rectangular cavity for receiving said disk therein and said disk is loaded by a spring causing said disk to bear against said cable.

9. The apparatus of claim 4 wherein each of said disks is urged against said cable by a resilient coil spring captured in and confined by a surrounding cylindrical chamber.

10. The apparatus of claim 9 wherein each of said disks makes contact with axially offset portions of said cable.

11. The apparatus of claim 1, further comprising a plurality of resilient biasing members, one such biasing member associated with each of said jamming members, and wherein each of said jamming members comprises a rotatable disk having a circular periphery bearing against said cable biased by its associated biasing member.

12. A cable lock device for closing a cargo container comprising:
    (a) a closed housing comprising a solid body between two ends of said housing;
    (b) an elongate cable having a free end and a dead end wherein the dead end of the cable is connected to said housing;
    (c) an internal passage from end to end of said housing to receive said cable free end and having a surface for cable contact wherein the passage receives the cable free end at an inlet; and
    (d) a plurality of jamming members radially offset from each other with respect to said cable wherein, each of said jamming members is movably mounted within a dedicated sloping slot within said housing, and each of said jamming members is adapted to move toward and away from said cable so that said jamming members jam against said cable to thereby lock said cable against said surface, and wherein the jamming members are axially offset from each other with respect to said cable when in a locked position.

13. The apparatus of claim 12 wherein said closed housing incorporates said surface extending along at least a portion of said internal passage to define said passage and said passage is eccentered.

14. The apparatus of claim 12, further comprising a resilient biasing member, and wherein each of said jamming members comprises a rotatable disk having a circular periphery bearing against said cable biased by the biasing member.

15. The apparatus of claim 12, further comprising a resilient biasing member associated with each of the jamming members, and wherein each of said biasing members bears against its associated jamming member to urge said jamming member toward said cable, and wherein each of said jamming members is moved aside when said cable is inserted through said passage.

16. The apparatus of claim 15 wherein each said jamming member is a disk and said disk is confined between a pair of associated slot faces to move therebetween, and each said sloping slot tapers to guide said disk against said cable.

17. The apparatus of claim 16 wherein each said disk is captured between said associated slot faces to wedge against said cable, and when installed in said housing, is positioned for locking.

18. The apparatus of claim 12 including a rotatable surrounding sleeve encircling the housing.

19. A cable lock device for closing a cargo container comprising:
 (a) an axially oriented cylindrical body having two spaced ends;
 (b) an elongate cable having a free end passing along an internal passage through said body to recrive said cable free end and having a surface in said passage contact wherein the passage receives the cable free end at one end of said passage for insertion through said passage;
 (c) an externally mounted surrounding howwow cylindrical sleeve fitting rotatably about said body wherein said sleeve is locked to surround said body between the two ends thereof, and said sleeve and said body are free to relatively rotate; and
 (d) an axially actuated movable jamming member in said body and received therein adjacent to said passage so that said movable jamming member moves towards and away from said cable for jamming said cable against said surface while the jamming member is in abutting contact with the body, so that the body and the sleeve remain free to rotate relative to one another when the cable is jammed against the surface.

20. The apparatus of claim 19 wherein said closed incorporates said surface extending along at least a portion of said internal passage to define said passage and further including at least a pair of adjacent slots for at least a pair of said jamming members.

21. The apparatus of claim 20 wherein said slots are radially offset at angles relative to each other in said body.

22. The apparatus of claim 19 further comprising a resilient biasing member, and said jamming member comprises a rotatable disk having a circular periphery bearing against said cable biased by the biasing member.

23. The apparatus of claim 19 further comprising multiple radial slots in said body wherein each slot receives a resilient biasing member associated with a jamming member, and wherein each of said biasing members bears against its associated jamming member to urge said jamming member toward said cable, and wherein each of said jamming members is moved aside when said cable is inserted through said passage.

24. The apparatus of claim 23 wherein each said jamming member is a disk and said each disk is confined between a pair of associated slot faces to move therebetween, and each said sloping slot tapers to guide said disk against said cable.

25. The apparatus of claim 24 wherein each said disk is captured between said associated slot faces to wedge against said cable, and when installed in said housing, is positioned for locking.

26. The apparatus of claim 25 wherein each of said disks makes contact with axially offset portions of said cable.

27. A cable lock device comprising:
 (a) an elongate cylindrical solid body having two ends and an internal passage through the body from one end to the other;
 (b) an elongate cable having a free end passing through the internal passage, wherein said passage has a surface for cable contact;
 (c) a pair of jamming members radially offset from each other with respect to said cable, wherein each of said jamming members is movably mounted within a dedicated sloping slot within said body, and each of said jamming members is adapted to move toward and away from said cable so that said jamming members jam against said cable to thereby lock said cable against said surface; and
 (d) the passage defining an opening in an end of said body for closely receiving the cable, said opening having a shape corresponding to the cross sectional shape of said cable except for a radially protruding nose portion at a location corresponding to an apex of said dedicated slots to reduce clearance between said cable and said passage and to thereby defeat a tool attempting to push up both discs simultaneously.

28. The apparatus of claim 27 wherein said body incorporates said surface extending along said internal passage to define said passage, opposite of first and second offset jamming members.

29. The apparatus of claim 27 wherein each of said jamming members comprises a resiliently urged rotatable disk having a circular periphery bearing against said cable.

30. The apparatus of claim 29 wherein said disks are positioned originally to move to jam said cable against said face, and are resiliently moved aside when said cable is inserted through said passage.

31. The apparatus of claim 29 wherein jamming members are disks and said disks are each confined by a sloping face to wedge against cable.

32. The apparatus of claim 29 wherein each of said disks is urged against said cable by a resilient coil spring captured in and confined by a surrounding cylindrical chamber.

33. The apparatus of claim 32 wherein the surrounding cylindrical chamber is wider than each of the disks.

34. The apparatus of claim 29 including a sloping shoulder in each of said chambers in said body positioned to move said disk away from said cable and wherein said chamber is arranged so that said cable free end during insertion is guided by confining the cable along said internal passage so that said cable is clamped after insertion.

35. The device of clamp 27 wherein the jamming members are radially offset from each other by about 90°.

* * * * *